United States Patent
Jassal et al.

(10) Patent No.: US 10,491,061 B2
(45) Date of Patent: Nov. 26, 2019

(54) ROTOR FOR A RELUCTANCE MACHINE

(71) Applicant: GENERAL ELECTRIC COMPANY, Schenectady, NY (US)

(72) Inventors: Anoop Jassal, Munich (DE); Mohamed Osama, Garching (DE); Francesco Papini, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 843 days.

(21) Appl. No.: 14/961,957

(22) Filed: Dec. 8, 2015

(65) Prior Publication Data
US 2017/0163106 A1 Jun. 8, 2017

(51) Int. Cl.
 *H02K 1/24* (2006.01)
 *H02K 5/00* (2006.01)
 *H02K 1/04* (2006.01)
 *H02K 15/02* (2006.01)

(52) U.S. Cl.
 CPC ............... *H02K 1/246* (2013.01); *H02K 1/04* (2013.01); *H02K 5/00* (2013.01); *H02K 15/02* (2013.01)

(58) Field of Classification Search
 CPC ............ H02K 1/246; H02K 1/04; H02K 5/00; H02K 15/02
 See application file for complete search history.

(56) References Cited

U.S. PATENT DOCUMENTS

| | | | | |
|---|---|---|---|---|
| 2,939,025 A | * | 5/1960 | Williford, Jr. ......... | H02K 19/14 310/156.78 |
| 3,671,789 A | * | 6/1972 | Menzies ................ | H02K 1/246 310/163 |
| 4,888,513 A | * | 12/1989 | Fratta ..................... | H02K 1/246 310/216.017 |
| 4,924,130 A | * | 5/1990 | Fratta ................... | H02K 1/2766 310/156.53 |
| 5,010,267 A | * | 4/1991 | Lipo ...................... | H02K 1/246 310/162 |

(Continued)

FOREIGN PATENT DOCUMENTS

EP 2169805 A1 * 3/2010 ............. H02K 1/246

OTHER PUBLICATIONS

Akaki, et al; "Effect of Magnetic Property in Bridge Area of IPM Motors on Torque Characteristics," IEEE Transactions on Magnetics, pp. 2335-2338, vol. 49, No. 5, May 2013.

(Continued)

*Primary Examiner* — Mohamad A Musleh
(74) *Attorney, Agent, or Firm* — Dority & Manning, P.A.

(57) ABSTRACT

A rotor for a reluctance machine includes a central rotor support rigidly connected to a machine shaft extending laterally along a central axis of the machine. The rotor support has an outer rotor support surface. A non-ferromagnetic channel support is rigidly affixed to the rotor support surface and projects radially relative to the central axis from the rotor support surface to define an outer rotor diameter of the rotor. The rotor also includes an array of arcuate ferromagnetic flux guide channels. The flux guide channels are embedded in the non-ferromagnetic channel support, wherein portions of the channel support abutting the flux guide channels function as non-ferromagnetic flux barriers. The flux barriers provide structural support for the flux guide channels.

8 Claims, 17 Drawing Sheets

(56) References Cited

U.S. PATENT DOCUMENTS

| | | | |
|---|---|---|---|
| 5,296,773 A * | 3/1994 | El-Antably | H02K 1/246 310/106 |
| 5,831,367 A * | 11/1998 | Fei | H02K 1/246 310/216.107 |
| 5,893,205 A * | 4/1999 | McClelland | H02K 1/246 29/598 |
| 5,903,080 A * | 5/1999 | Nashiki | H02K 1/246 310/162 |
| 5,994,814 A * | 11/1999 | Kawabata | H02K 1/08 310/156.18 |
| 6,064,134 A * | 5/2000 | El-Antably | H02K 1/246 310/156.21 |
| 6,285,104 B1 * | 9/2001 | Nashiki | H02K 1/165 310/184 |
| 6,849,983 B2 * | 2/2005 | Tajima | H02K 1/246 310/156.53 |
| 6,858,961 B2 | 2/2005 | Tagome et al. | |
| 6,987,343 B2 | 1/2006 | Tagome et al. | |
| 7,015,614 B2 | 3/2006 | Sakuma et al. | |
| 7,504,755 B2 | 3/2009 | Yabe et al. | |
| 8,004,140 B2 | 8/2011 | Alexander et al. | |
| 8,508,092 B2 | 8/2013 | Ankeney et al. | |
| 9,088,189 B2 | 7/2015 | Buskirk et al. | |
| RE46,867 E * | 5/2018 | Moghaddam | |
| 2003/0062791 A1* | 4/2003 | Reiter, Jr. | B22F 7/06 310/156.53 |
| 2003/0063993 A1 | 4/2003 | Reiter, Jr. et al. | |
| 2007/0152527 A1* | 7/2007 | Yura | H02K 1/246 310/156.53 |
| 2013/0207488 A1* | 8/2013 | Labbe | H02K 1/04 310/43 |
| 2015/0171673 A1* | 6/2015 | Cioffi | H02K 1/246 310/216.004 |
| 2015/0280498 A1* | 10/2015 | Kolehmainen | H02K 1/246 310/216.107 |

OTHER PUBLICATIONS

Zhang, et al; "Study on unit combination type direct-driven submersible permanent magnet motor," 2014 17th International Conference on Electrical Machines and Systems (ICEMS), Oct. 22-25, 2014, pp. 3087-3091, Hangzhou.

\* cited by examiner

ROTOR FOR A RELUCTANCE MACHINE

TECHNICAL FIELD

The present description relates generally to electric machines. More specifically, the present invention relates to rotors for synchronous reluctance machines.

BACKGROUND

A reluctance machine (such as a reluctance motor, generator or the like) is a type of electric machine that typically induces non-permanent magnetic poles on a ferromagnetic rotor. Torque is generated through the phenomenon of magnetic reluctance. Reluctance machines can deliver very high power density at low cost, making them ideal for many applications.

There is a need, however, for a reluctance machine that does not utilize ferromagnetic structures, such as posts and bridges, to connect flux guides together, but is still able to maintain structural integrity of the rotor. Additionally, there is a need to optimize the topography of a rotor for a reluctance machine for increased flux flow, reduced flux leakage and increased torque. Moreover, there is a need for a reluctance machine with reduced weight at a given torque.

SUMMARY

Aspects of the present invention provide a rotor for a reluctance machine, and methods of making the same, that overcome the limitations of the conventional reluctance machine. Though some aspects of the present description may be directed toward the fabrication of components for a rotor for a reluctance machine aspects of the present system may be employed in the fabrication of any component on any industry, in particular, those components for electric machines in general.

A rotor for a reluctance machine constructed in accordance with one or more aspects of the present invention offers advantages and alternatives over the prior art by providing a reluctance machine, its associated rotor, and methods of making the same, that do not include the use of ferromagnetic structural features, such as posts and bridges, that provide paths for substantial flux leakage during operation of the machine. In one exemplary embodiment of the invention a rotor for a reluctance machine includes a central rotor support rigidly connected to a machine shaft extending laterally along a central axis of the machine, the rotor support has an outer rotor support surface. The rotor further includes a non-ferromagnetic channel support that is rigidly affixed to the rotor support surface and projects radially relative to the central axis from the rotor support surface to define an outer rotor diameter of the rotor. The rotor also includes an array of arcuate ferromagnetic flux guide channels. The flux guide channels are embedded in the non-ferromagnetic channel support, wherein portions of the channel support abutting the flux guide channels function as non-ferromagnetic flux barriers. The flux barriers provide structural support for the flux guide channels.

In another embodiment of the present invention a method of making a rotor for a reluctance machine includes forming a non-ferromagnetic channel support. The channel support includes a generally disc-shaped circular portion having an inner diameter sized to receive a rotor support and an outer diameter sized to fit within an inner diameter of a stator and rotate about a central axis of the reluctance machine. The circular portion includes first and second side surfaces defining a lateral thickness there between. The channel support also includes an array of arcuate slots extending laterally from first to second side surfaces. The channel support further includes a base plate integrally affixed to the second side surface of the circular portion such that the arcuate slots are open on only the first side of the circular portion. The method further includes inserting a plurality of arcuate ferromagnetic flux guide channels into the arcuate slots from the open side of the circular portion such that portions of the channel support abutting the flux guide channels function as non-ferromagnetic flux barriers. The flux barriers providing structural support for the flux guide channels.

In an alternative aspect of the present invention a method of making a rotor for a reluctance machine includes forming a pair of generally disc-shaped non-ferromagnetic first and second base plates. The base plates having an inner diameter sized to receive a rotor support and an outer diameter sized to fit within an inner diameter of a stator and rotate about a central axis of the reluctance machine. The first base plate has a first surface and the second base plate has a second surface. The method also includes disposing a first array of non-ferromagnetic first flux barriers onto the first surface. The first flux barriers project normally from the first surface a predetermined height from the first surface to form an array of arcuate first base plate slots. The method further includes disposing a second array of non-ferromagnetic second flux barriers onto the second surface, the second flux barriers project normally from the second surface a predetermined height from the second surface to form an array of arcuate second base plate slots. The first and second base plate slots have mirror image contours of each other. The method also includes inserting a plurality of arcuate ferromagnetic flux guide channels into the first base plate slots. The flux guide channels having a width which extends beyond the height of the first base plate slots to provide an exposed end portion of the flux guide channels. Additionally, the method includes inserting the exposed end portion of the flux guide channels into the second base plate slots. The first and second flux barriers provide structural support for the flux guide channels.

These and other aspects, features, and advantages of this invention will become apparent from the following detailed description of the various aspects of the present invention taken in conjunction with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the present invention will be readily understood from the following detailed description of aspects of the invention taken in conjunction with the accompanying drawings in which:

DETAILED DESCRIPTION

Certain exemplary embodiments will now be described to provide an overall understanding of the principles of the structure, function, manufacture, and use of the methods, systems, and devices disclosed herein. One or more examples of these embodiments are illustrated in the accompanying drawings. Those skilled in the art will understand that the methods, systems, and devices specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Figure 1:
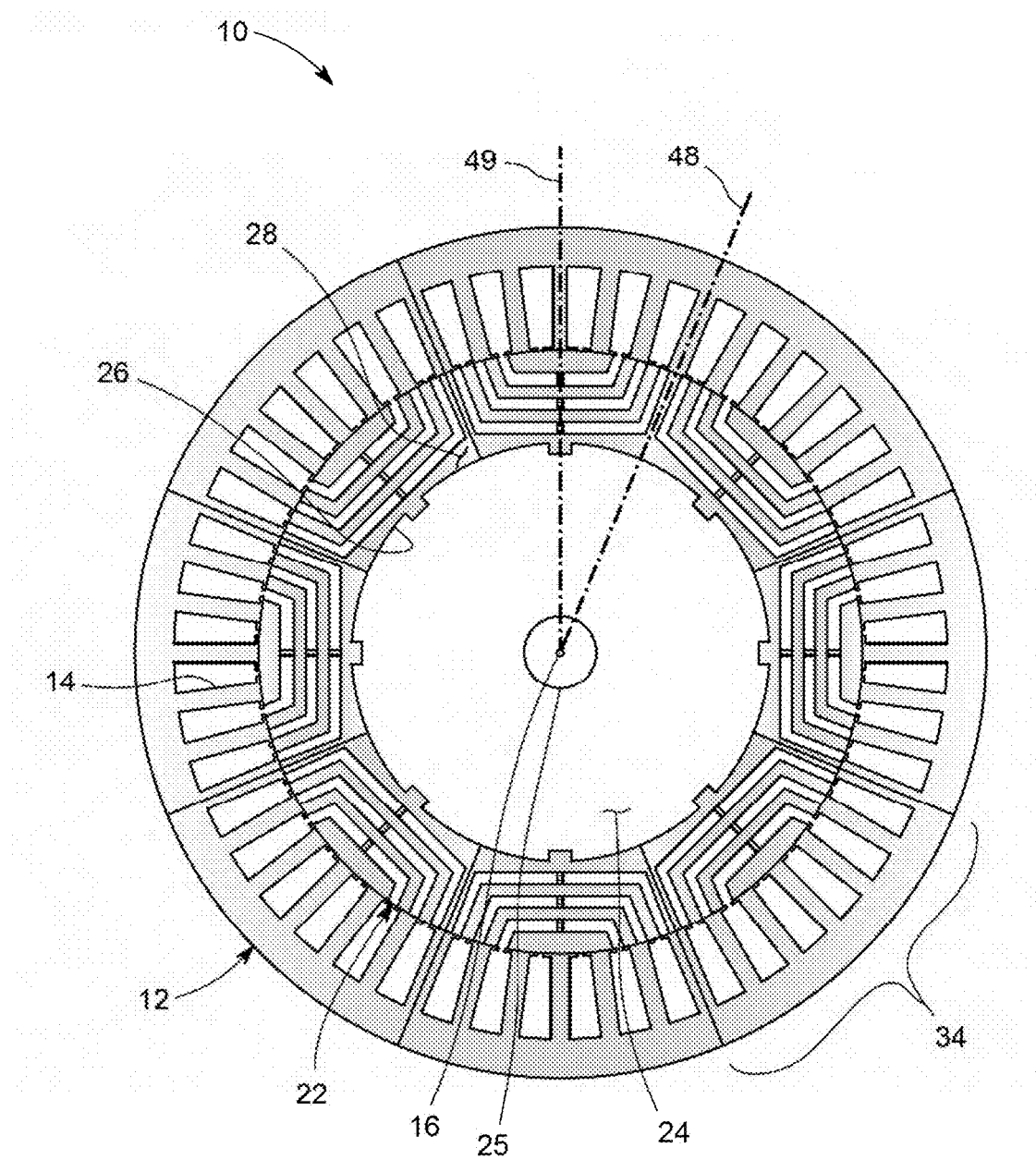
FIG. 1 is a side cross-sectional view of a typical prior art reluctance machine 10.
Figure 2:
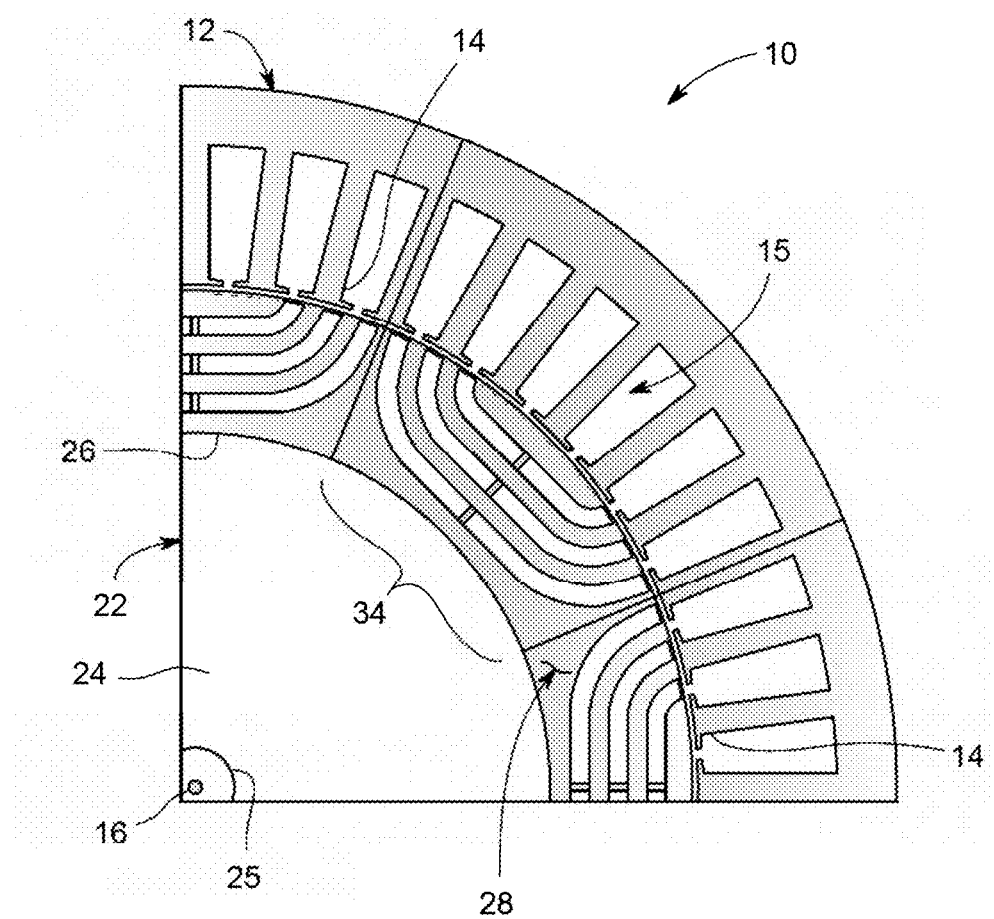
FIG. 2 is a blown up view of the upper right quadrant of FIG. 1.
Figure 3:
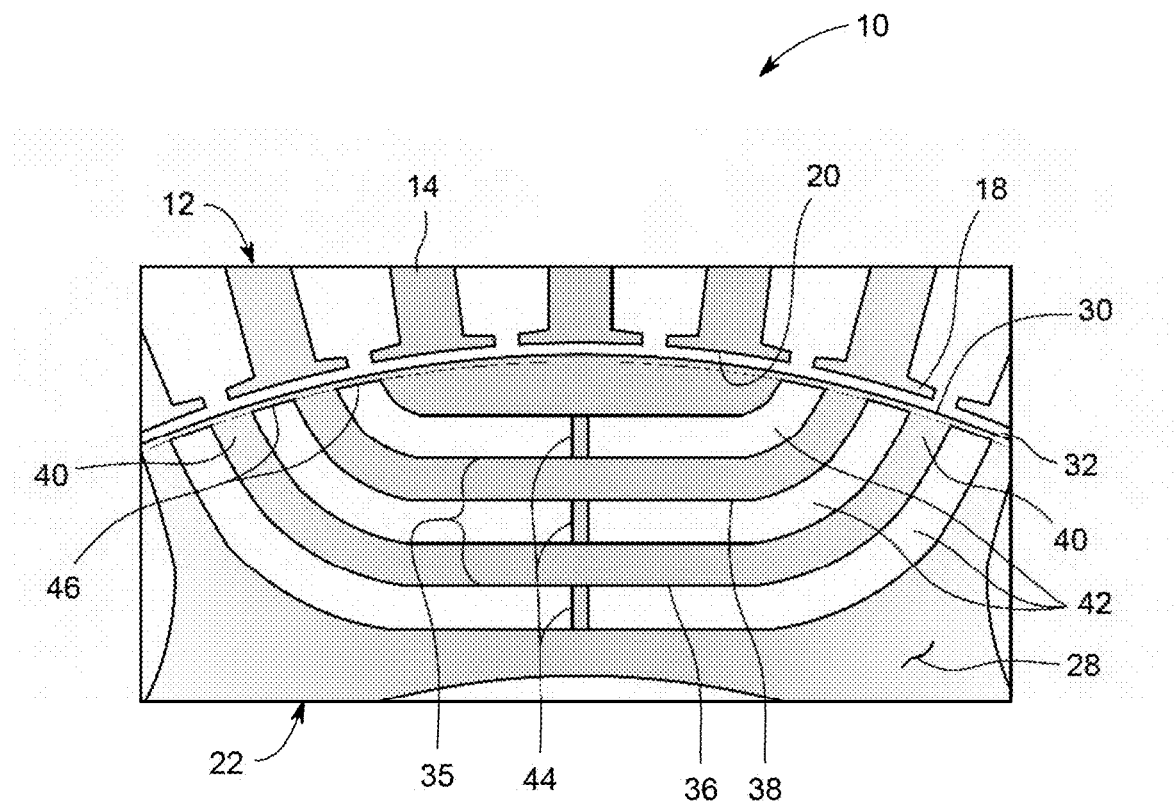
FIG. 3 is a blown up view of a mid-section of FIG. 2.

Referring to FIGS. 1, 2 and 3, wherein: FIG. 1 is a side cross-sectional view of a typical prior art reluctance machine 10; FIG. 2 is a blown up view of the upper right quadrant of FIG. 1; and FIG. 3 is a blown up view of a mid-section of FIG. 2. Reluctance machine 10 will include a stator 12 having a predetermined number of projecting electromagnetic stator teeth 14. Each tooth 14 extends radially inward toward a central axis 16. The teeth 14 further include distal ends 18 (best seen in FIG. 3), which define an inner stator diameter 20 (best seen in FIG. 3) of the stator 12. Coil windings (as indicated by arrow 15 in FIG. 2) are wound between and/or around the stator teeth 14. The coil windings may be distributed or concentrated as is well known.

Though this exemplary embodiment illustrates the stator as having teeth, one skilled in the art would recognize that in some reluctance machine applications the stators may be without teeth. One such exemplary application would be high speed air-gap winding motors, typically used in the dental profession. In such air gap motors the stator structure includes a toothless ring of ferromagnetic material having a seamless ring of windings that are disposed on an inner side of the ring.

Reluctance machine 10 will also include a rotor 22 configured to rotate about the central axis 16 within the inner diameter 20 of the stator 12. The rotor typically includes a central rotor support (or core) 24 rigidly connected to a machine shaft 25 (best seen in FIG. 1), which extends laterally along the central axis 16. The rotor support 24 will also have an outer rotor support surface 26.

A channel support 28 is typically a structure composed of ferromagnetic material (such as laminated stacks of electrical steel sheets) that is rigidly affixed to the rotor support surface 26. The channel support 28 extends radially relative to the central axis 16 from the rotor support surface 26 to define an outer rotor diameter 30 (best seen in FIG. 3) of the rotor 22. The outer rotor diameter 30 and the inner stator diameter 20 are separated by an air gap 32 (best seen in FIG. 3).

The channel support 28 can be a plurality of channel support segments 34, which are integrally connected circumferentially around the support surface 26. Alternatively, the channel support 28 can be a single continuous channel support 28 circumferentially extending around the entire perimeter of the support surface 26.

Portions of the channel support 28 are configured as a plurality of arrays 35 (best seen in FIG. 3) of arcuate flux guide channels 36 and 38. Though this exemplary embodiment illustrates the arrays 35 having two flux guide channels 36, 38 each, one skilled in the art would recognize that there can be more than two flux guide channels stacked into an array.

Typically within an array 35 the flux guide channels 36, 38 will have a pair of end portions 40 which abut, or are proximate to, the outer rotor diameter 30. The flux guide channels are generally stacked radially outward relative to the central axis 16 from a largest arcuate flux guide channel 36 to a smallest arcuate flux guide channel 38. The flux guide channels 36, 38 are typically separated by air gaps which function as flux barriers 42.

In order to maintain the structural integrity of the channel support 28, the flux guide channels 36, 38 must be connected together across the air gap flux barriers 42 by a plurality of posts 44 (best seen in FIG. 3), which are portions of the channel support 28 that span across the central regions of the air gap flux barriers 42. Additionally, in order to maintain structural integrity of the channel support 28, the ends 40 of the flux guide channels 36, 38 must be connected together across the flux barriers 42 by a plurality of bridges 46 (best seen in FIG. 3), which are portions of the channel support 28 that span across the distal end regions of the air gap flux barriers 42. Both the posts 44 and bridges 46 are composed of the same ferromagnetic material as the rest of the channel support 28.

During operation, when the stator 12 is energized, the ferromagnetic flux guide channels 36, 38 offer a high reluctance along a first axis 48 and low reluctance along a second axis 49. By way of example, in a three phase AC synchronous reluctance machine the first and second axes 48, 49 are typically the well known quadrature (or "q") axis and direct (or "d") axes respectively, which are typically oriented at 90 degrees relative to each other and rotate about the central axis 16 at the frequency rate of the AC input power.

Due to this difference in reluctance along different axes 48, 49, the rotor 22 always tries to align its least reluctance path along the direction of the magnetic field produced by the stator. The stator windings 15 produce a rotating magnetic field which constantly changes its position and the rotor follows, resulting in rotation. Again, by way of example, synchronous reluctance machines have an equal number of stator and rotor poles and will run on 3-phase AC power. The AC power produces a rotating magnetic field within the stator 12, which continuously pulls the rotor poles to rotate the rotor 22.

Figure 4:
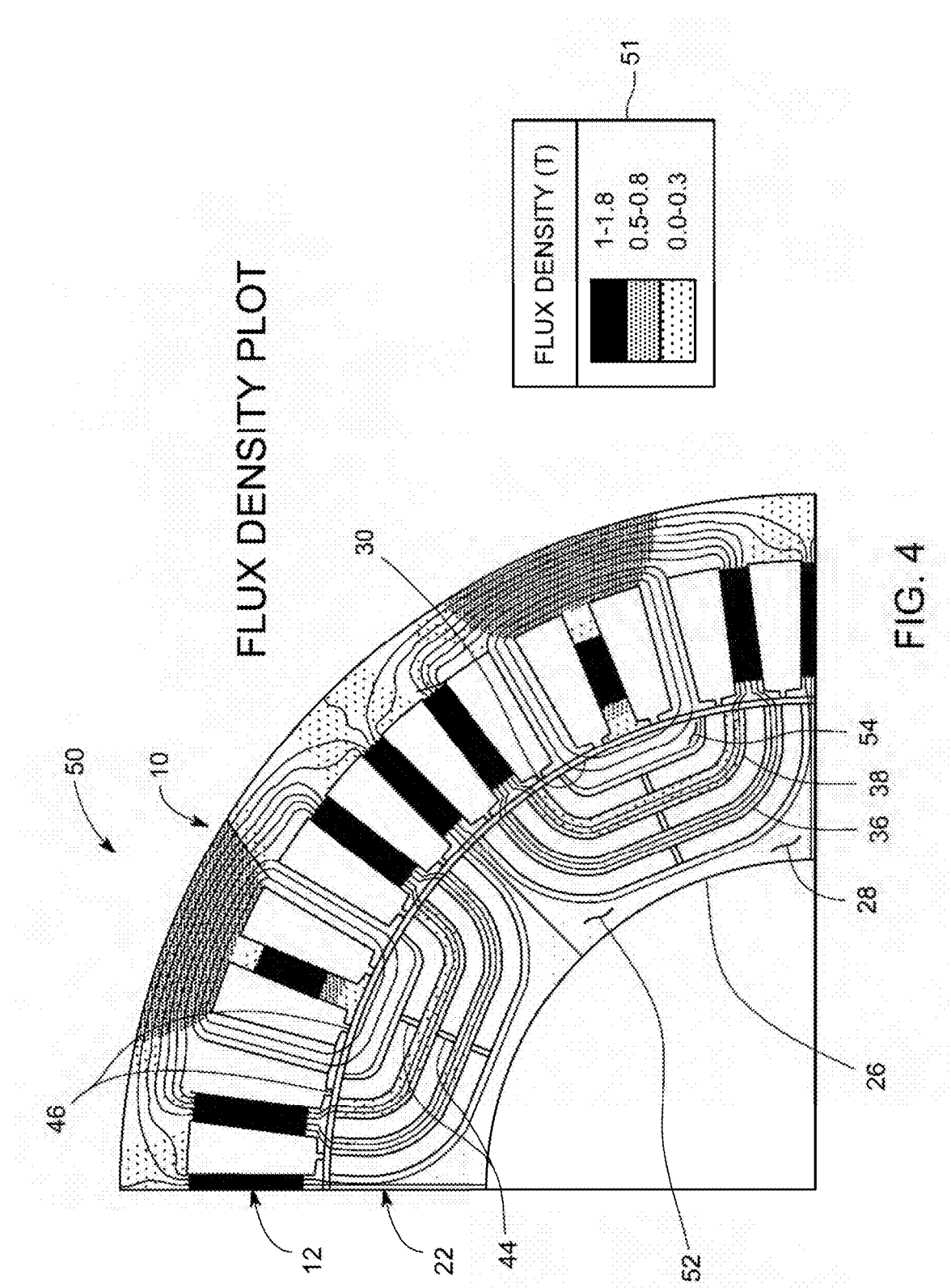
FIG. 4 is a graduated plot of flux flow during operation of the prior art reluctance machine of FIG. 1.

Referring to FIG. 4, a graduated plot 50 of flux flow during operation of the prior art reluctance machine 10 of FIG. 1 is presented. The graduated scale 51 varies from 0.0-2.0 Tesla (T), wherein 0-0.7 T represents a low flux flow region, 0.7-1.36 T represents a medium flux flow region and above 1.36 T represents a high flux flow region on machine 10. Any structure on machine 10 indicating a low flux flow (i.e., 0-0.7 T on scale 51) is either a flux barrier or not a useful structure for conducting flux. As can be seen, even though the posts 44 and bridges 46 are necessary for structural integrity of channel support 28, they also undesirably provide a path for substantial flux leakage across the flux guide channels 36, 38. This leakage significantly reduces torque density.

Additionally, the portions 52 of the channel support 28, which are proximate the outer rotor support surface 26, and the portions 54 of the channels support 28, which are proximate the outer rotor diameter 30, conduct very little flux through them. In fact, they are of little use as flux guides and do not significantly contribute to machine torque. Additionally, portions 52 and 54 of the channel support 28 add significant weight to the machine 10 since the ferromagnetic material they are composed of (typically a sheet steel or iron) generally has a high weight density.

FIGS. 5-13 illustrate various exemplary embodiments of a reluctance machine 100 and associated rotor 122 which do not utilize ferromagnetic structures, such as posts and bridges, to connect flux guides together, but are still able to maintain structural integrity of the rotor in accordance with one or more aspects of the present invention. Additionally, the rotor flux guides are more optimally placed in the rotor 122 for greater flux flow and less flux leakage during operation, thus leading to a significant increase in torque density. Moreover the machine 100 is lighter than prior art reluctance machines (such as reluctance machine 10) since the rotor 122 contains proportionally less ferromagnetic material.

FIGS. 14-19 illustrate various exemplary embodiments of methods of making the rotor 122 of reluctance machine 100.

Embodiments of Reluctance Machine 100 (FIGS. 5-13)

Figure 5:
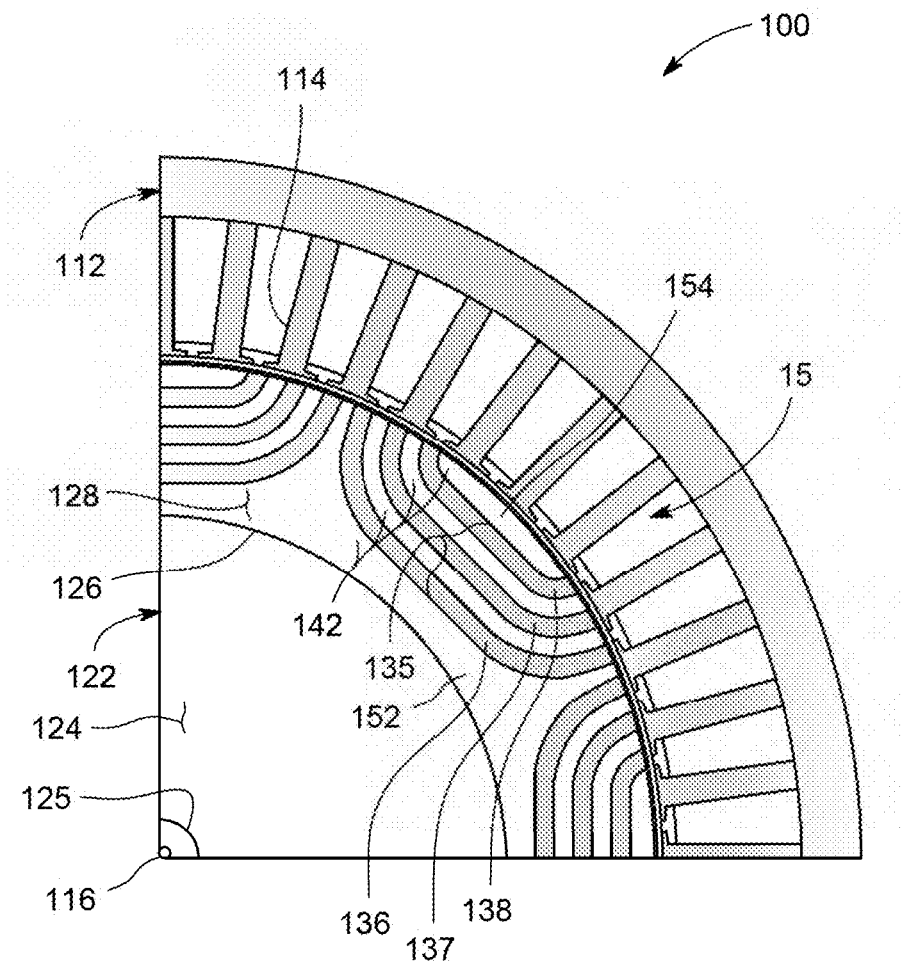
FIG. 5 is a side cross-sectional view of an upper right quadrant of an exemplary embodiment of a reluctance machine 100 in accordance with the present invention.
Figure 6:
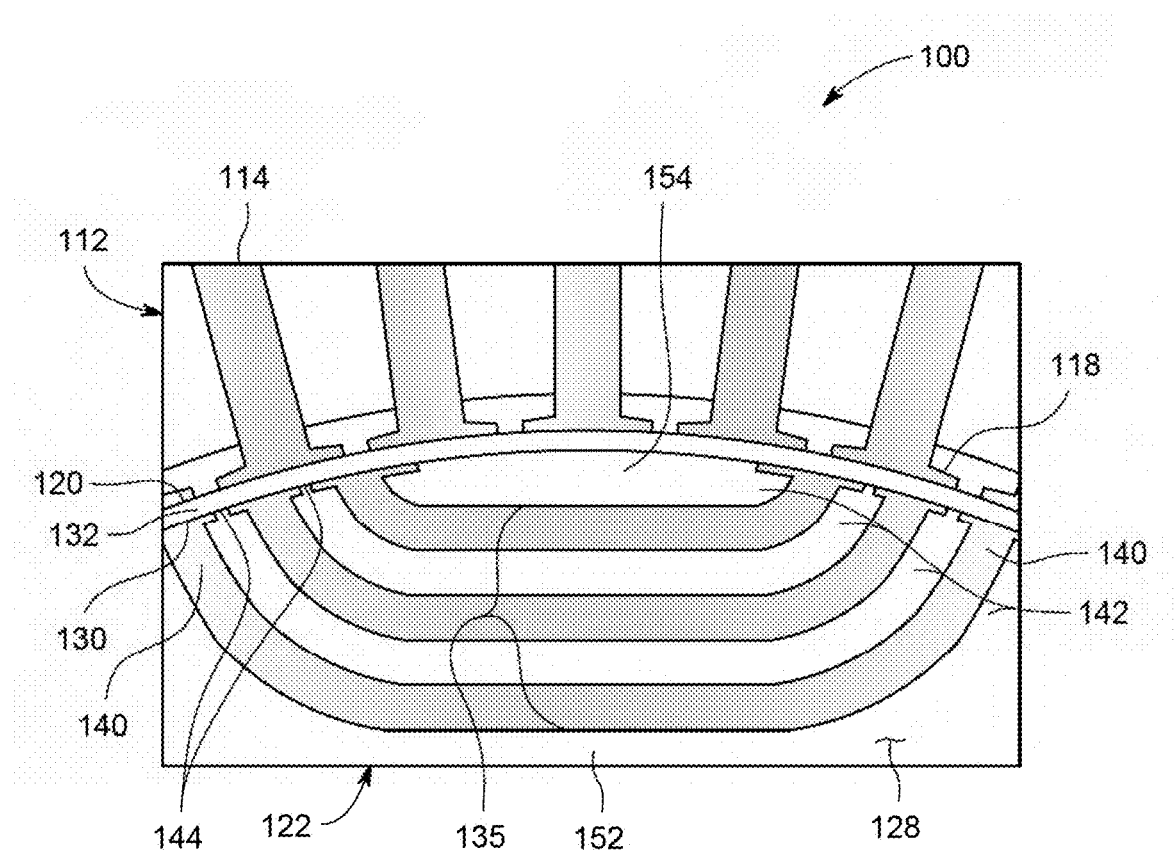
FIG. 6 is a blown up view of a mid-section of FIG. 5 in accordance with the present invention.

Referring to FIGS. 5 and 6, wherein: FIG. 5 is a side cross-sectional view of an upper right quadrant of an exemplary embodiment of a reluctance machine 100 in accordance with one or more aspects of the present invention; and FIG. 6 is a blown up view of a mid-section of FIG. 5.

In this particular exemplary embodiment, reluctance machine 100 includes a stator 112 that is virtually the same as stator 12 of prior art machine 10. Accordingly, stator 112 has a predetermined number of projecting electromagnetic stator teeth 114. Each tooth 114 extends radially inward toward a central axis 116 (best seen in FIG. 5). The teeth 114 further include distal ends 118 (best seen in FIG. 6), which define an inner stator diameter 120 (best seen in FIG. 3) of the stator 112. Coil windings (as indicated by arrow 115 in FIG. 5) are wound between and/or around the stator teeth 14. The coil windings may be distributed or concentrated as is well known.

Reluctance machine 100 also includes a rotor 122 configured to rotate about the central axis 116 within the inner diameter 120 of the stator 112. The rotor includes a central rotor support (or core) 124 rigidly connected to a machine shaft 125 (best seen in FIG. 5), which extends laterally along the central axis 116. The rotor support 124 will also have an outer rotor support surface 126.

A channel support 128 is rigidly affixed to the rotor support surface 126. The channel support 128 extends radially relative to the central axis 116 from the rotor support surface 126 to define an outer rotor diameter 130 (best seen in FIG. 6) of the rotor 122. The outer rotor diameter 130 and the inner stator diameter 120 are separated by an air gap 132 (best seen in FIG. 6).

Unlike the prior art channel support 28 of machine 10, the channel support 128 of machine 100 is compose of a non-electrically conductive, non-ferromagnetic material. The non-electrically conductive, non-ferromagnetic material can be a high performance thermoplastic material with appropriate strength and temperature characteristics for the application requirements of machine 100. Such high performance thermoplastic material may be a polyether ether ketone (PEEK), polyphenylene sulfide (PPS), polyetherimide (PEI), polyamide-imides (PAI) and/or polyethersulfone (PES). Alternatively, the non-electrically conductive, non-ferromagnetic material can be any suitable ceramic.

The channel support 128 in this embodiment is a single continuous channel support circumferentially extending around the entire perimeter of the support surface 126. However, the channel support 128 may also be composed of a plurality of channel support segments integrally connected circumferentially around the support surface 126.

Embedded in the non-ferromagnetic channel support 128 are a plurality of arrays 135 of arcuate ferromagnetic flux guide channels 136, 137 and 138. Though this exemplary embodiment illustrates the arrays 135 having three flux guide channels 136, 137 and 138 each, one skilled in the art would recognize that there can be more than three flux guide channels stacked into an array.

The flux guide channels 136, 137 and 138 each have a pair of end portions 140 which abut, or are proximate to, the outer rotor diameter 130. The flux guide channels are generally stacked radially outward relative to the central axis 116 from a largest arcuate flux guide channel 136 to a smallest arcuate flux guide channel 138.

Advantageously, as compared to prior art rotor 22 of machine 10 wherein air gaps function as flux barriers 42, portions of the channel support 128 abutting the flux guide channels 136, 137 and 138 function as non-ferromagnetic flux barriers 142. Significantly, the flux barriers 142 provide structural support for the flux guide channels 136, 137 and 138 without the use of ferromagnetic interconnecting material, such as the posts 44 and bridges 46 of prior art machine 10. Preferably, the non-ferromagnetic flux barriers 142 surrounding and embedding the flux guide channels 136, 137 and 138 provide the sole structural support for the flux guide channels. In this regard, the end portions 140 are not magnetically connected, but instead are magnetically isolated from each other with small sections 144 (best seen in FIG. 6) of the non-ferromagnetic material of channel support 128.

When the channel support 128 is compared to the prior art channel support 28, it can be seen that the ferromagnetic material and non-ferromagnetic material of the two channels supports 28 and 128 have essentially been swapped. Therefore, where there were three air gap flux barriers 42 in the prior art channel support 28, there are now three ferromagnetic flux guide channels 136, 137 and 138 embedded in the channel support 128. Additionally, where there were two ferromagnetic flux guide channels 36 and 38 in channel support 28, there are now two flux barriers 142 located between the three channel supports 136, 137 and 138.

Moreover, unlike the prior art channel support 28, the portions 152 of channel support 128, which are proximate the outer rotor support surface 126, and the portions 154 of the channel support 128, which are proximate the outer rotor diameter 130, are now composed of non-ferromagnetic material. By making portions 152 and 154 non-ferromagnetic, the weight density of the machine 100 is advantageously reduced compared to the prior art weight density of machine 10.

Figure 7:
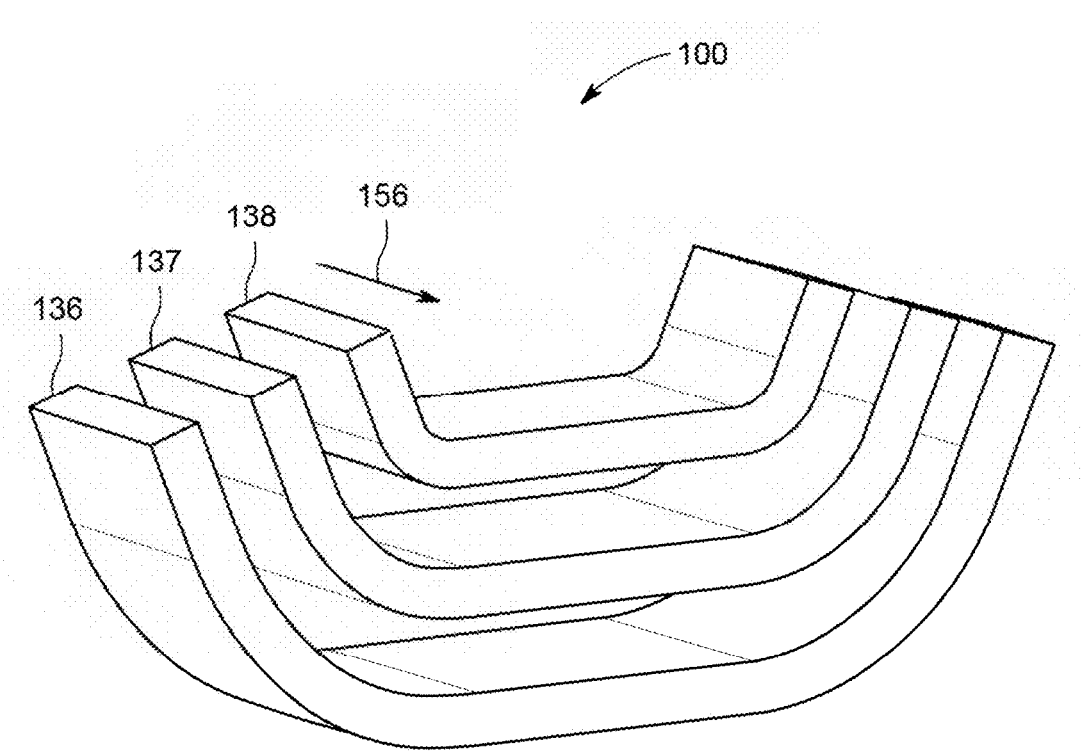
FIG. 7 is a perspective view of flux guide channels in accordance with the present invention.

Referring to FIG. 7, the ferromagnetic flux guide channels 136, 137 and 138 extend laterally (as indicated by arrow 156) relative to the central axis 116 of machine 100. The flux guide channels can be composed of a laminar stack of thin strips of sheet steel or iron that is glued or stapled together. Alternatively, the flux guide channels can be manufactured additively as a solid metallic structure from highly magnetically conductive material, such as iron-cobalt powder or other iron powders. The flux guides can also be manufactured in a variety of other additive manufacturing process, such as 3D printing.

Figure 8:
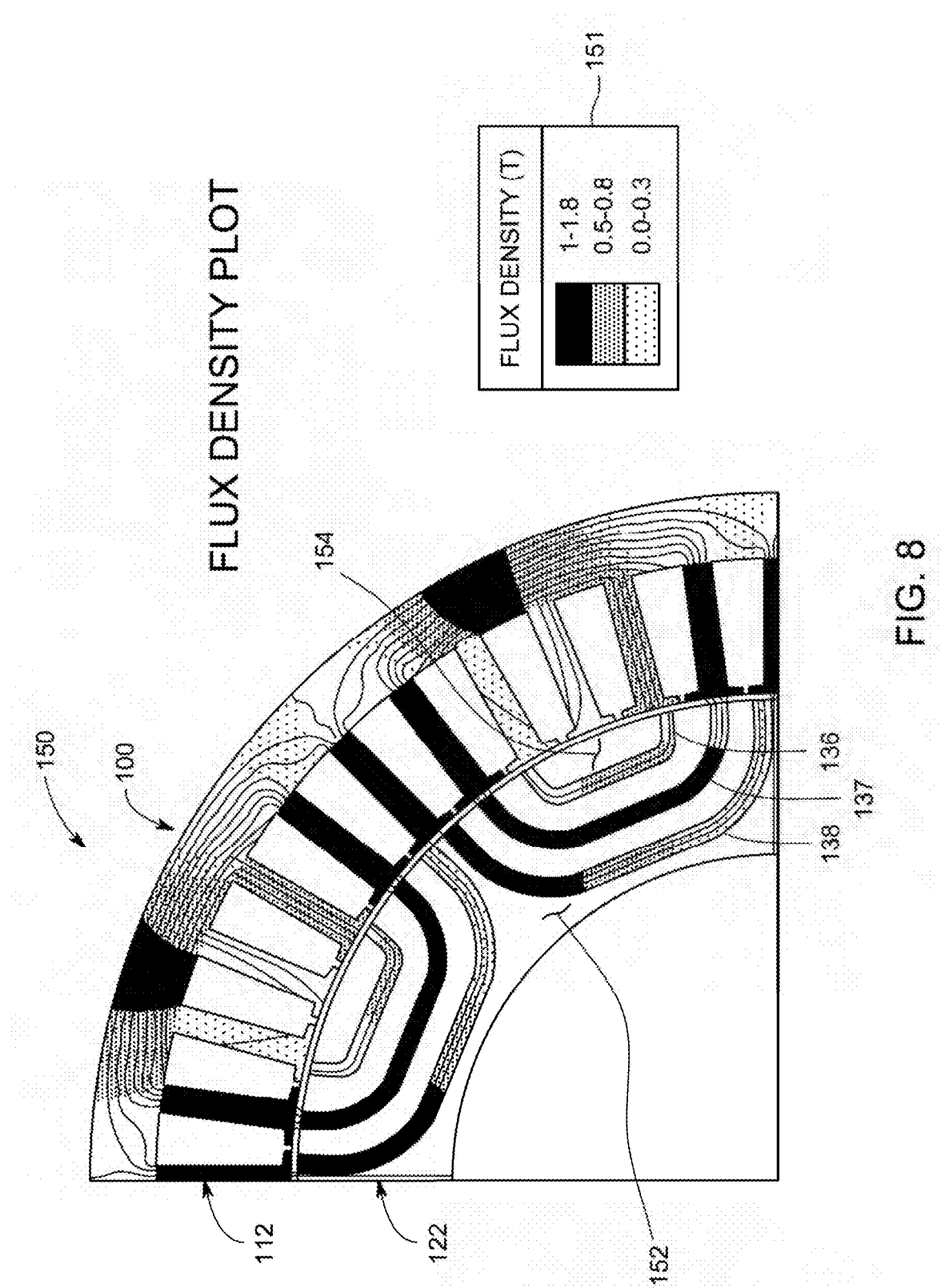
FIG. 8 is a graduated plot of flux flow during operation of the reluctance machine of FIG. 5 in accordance with the present invention.

Referring to FIG. 8, a graduated plot 150 of flux flow during operation of the reluctance machine 100 of FIG. 5 is presented. The graduated scale 151 varies from 0.0-2.0 T, wherein 0-0.7 T represents a low flux flow region, 0.7-1.36 T represents a medium flux flow region and above 1.36 T represents a high flux flow region on machine 100. Any structure on machine 100 indicating a low flux flow (i.e., 0-0.7 T on scale 51) is either a flux barrier or not a useful structure for conducting flux. As can be seen, without posts and bridges connecting flux guide channels 136, 137 and 138, there are no leakage paths between them. Accordingly, the torque is significantly increased. Moreover, the regions 152 and 154 function as effective flux barriers and have a reduced weight compared to analogous regions 52 and 54 of prior art machine 10.

Figure 9:
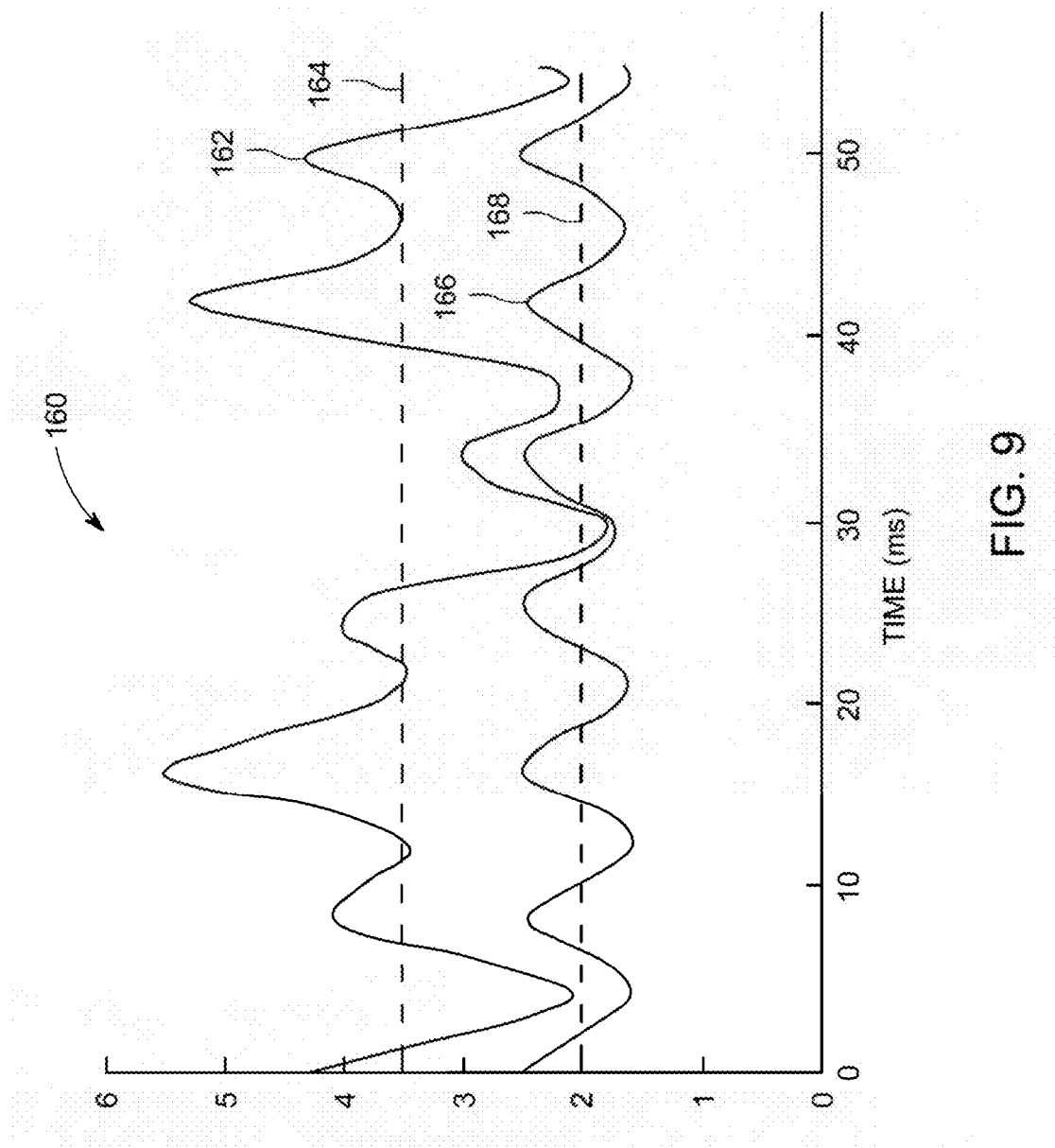
FIG. 9 is a torque comparison graph in accordance with the present invention.

Referring to FIG. 9, a torque comparison graph 160 is presented. Graph 160 compares the simulated instantaneous torque 162 and average torque 164 of machine 100 of the present invention with the simulated instantaneous torque 166 and average torque 168 of the prior art machine 10. The torque comparisons were simulated on the basis of both machines 10 and 100 having the same input current. As can be seen, both instantaneous torque 162 and average torque 164 of machine 100 are significantly greater than the instantaneous torque 166 and average torque 168 of prior art machine 10.

In the exemplary embodiments of machines 10 and 100 represented in graph 160, the torque ripple (defined as the peak to peak torque variation of the instantaneous torque divided by the average torque) is significantly greater in machine 100 of the present invention compared to the prior art machine 10 for the same input current. However, certain existing geometric features of the rotor 122, including existing geometric features of the flux guide channels 136, 137 and 138 of machine 100 can readily be adjusted and optimized to help reduce torque ripple. By way of example, one such geometric feature would be the angle of incline of the flux guide channels 136, 137 and 138.

Figure 10:
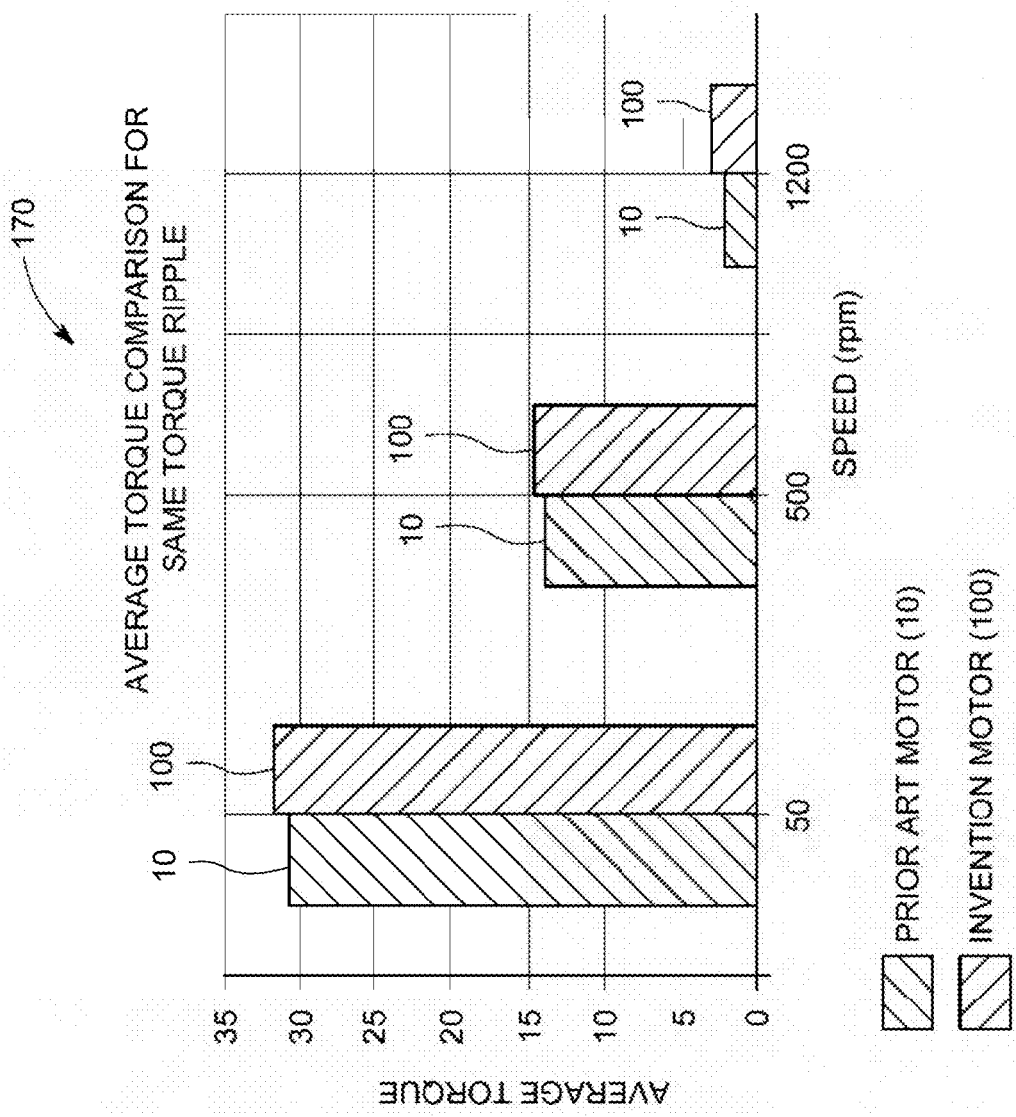
FIG. 10 is an average torque comparison graph in accordance with the present invention.

Referring to FIG. 10, an average torque comparison graph 170 is presented. For this comparison graph 170, the previously discussed geometric features of the flux guide channels 136, 137 and 138 were adjusted to reduce torque ripple of machine 100 to approximately the same torque ripple as prior art machine 10. A simulated comparison of average torque of machines 100 and 10 was then plotted in graph 170 at the following three cases:

| Case | Current (amps) | Speed (rpm) |
|------|----------------|-------------|
| 1    | 10             | 50          |
| 2    | 5              | 500         |
| 3    | 2              | 1200        |

As can be seen, in each case, the average torque of machine 100 remained significantly higher than the average torque of prior art machine 10.

Figure 11:
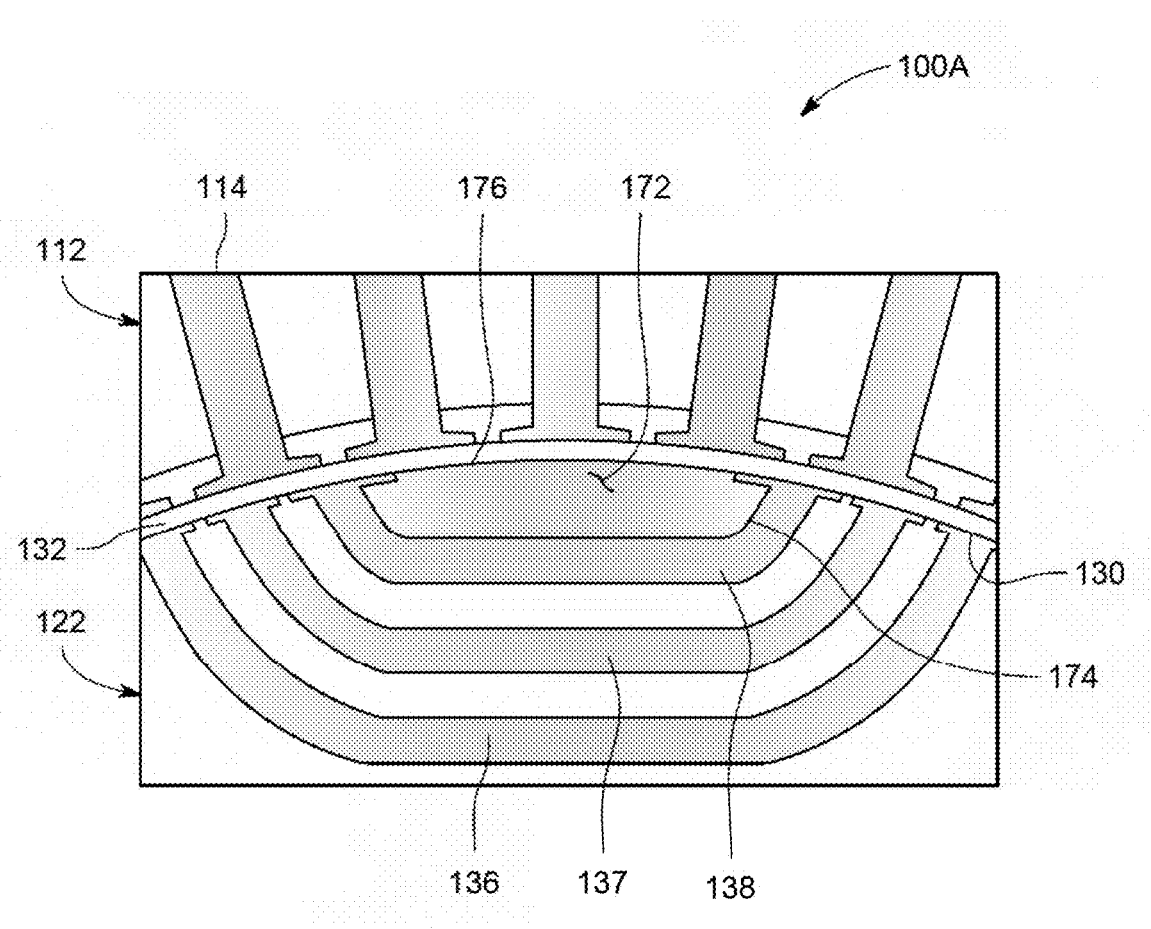
FIG. 11 is another exemplary embodiment of a reluctance machine 100A having a ferromagnetic wedge disposed in the rotor in accordance with the present invention.

Referring to FIG. 11, another exemplary embodiment of the invention is presented in machine 100A. Machine 100A is identical to machine 100 with the addition of a ferromagnetic wedge 172. In addition to adjusting the existing geometric features of the flux guide channels 136, 137 and 138, other structural features can be added to the rotor 122 to significantly reduce torque ripple for a given average torque. As illustrated in FIG. 11, one such ripple reducing feature is a ferromagnetic wedge 172, disposed under the smallest arcuate flux guide channel 138. In operation, wedge 172 helps to reduce well known slot harmonics in machine 100A, which helps to reduce torque ripple.

Ferromagnetic wedge 172 is composed of ferromagnetic material (such as sheet steel or iron) and extends laterally relative to the central axis 116. The wedge 172 has a radially inner surface 174 proximate the smallest arcuate flux guide channel 138, and a radially outer surface 176 proximate the outer rotor diameter 130. In this particular embodiment the inner surface 174 actually abuts the flux guide channel 138. However, one skilled in the art would recognize that a non-ferromagnetic flux barrier may be disposed between the smallest arcuate flux guide channel 138 and the inner surface 174 of the wedge 172. Further, one skilled in the art would recognize that the wedge 172 and flux guide channel 138 could be integrally connected as one ferromagnetic structure.

Figure 12:
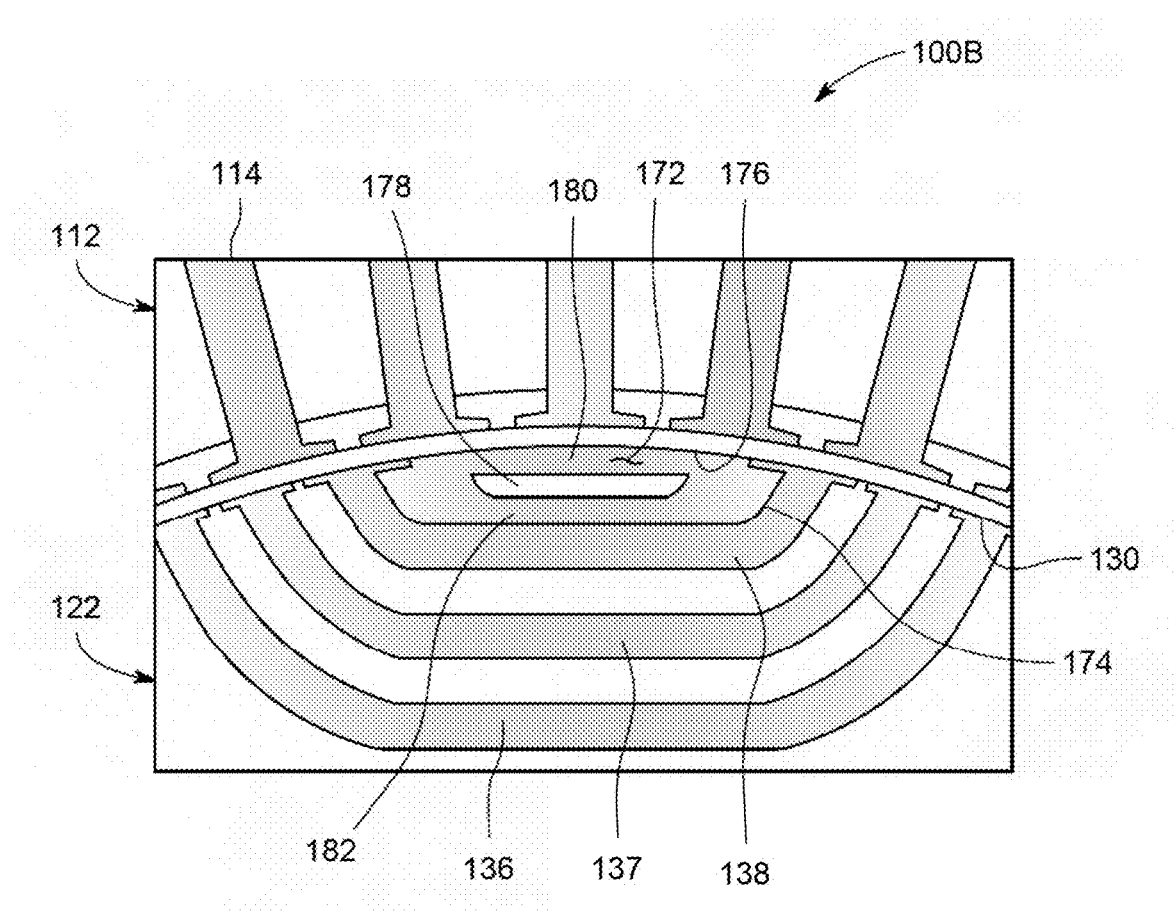
FIG. 12 is another exemplary embodiment of a reluctance machine 100B having a ferromagnetic wedge with an aperture disposed in the rotor in accordance with the present invention.

Referring to FIG. 12, another exemplary embodiment of the invention is presented in machine 100B. Machine 100B is identical to machine 100A with the addition of an aperture 178 through the ferromagnetic wedge 172. In machine 100B the ferromagnetic wedge 172 includes an aperture 178 disposed laterally there through. The aperture 178 defines a radially outer portion 180 of the wedge 172 on a side of the aperture 178 proximate the outer rotor diameter for reducing ripple. Additionally, aperture 178 defines a radially inner portion 182 of the wedge 172 on an opposing side of the aperture 178 proximate the smallest arcuate flux guide channel 138 for guiding magnetic flux.

Figure 13:
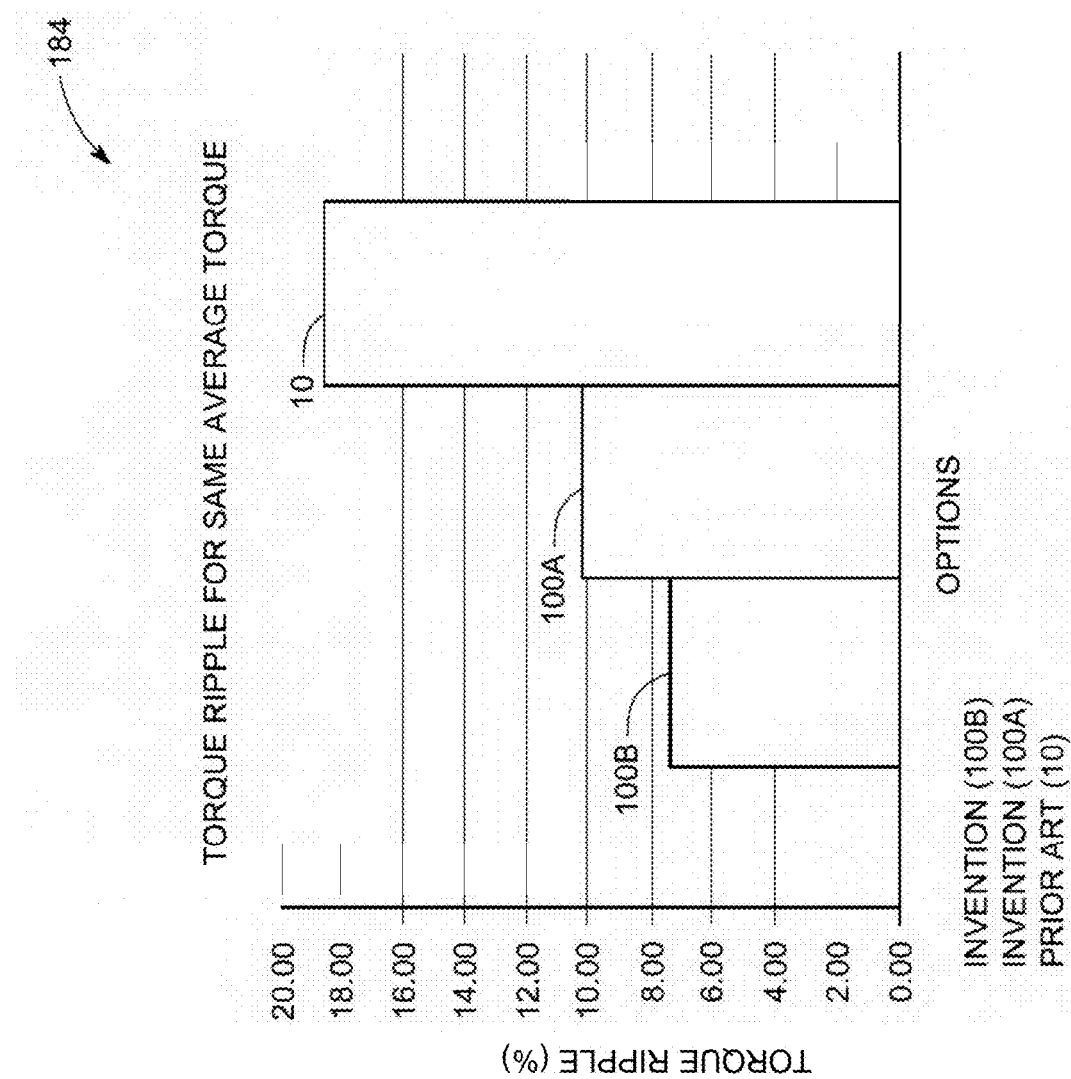
FIG. 13 is a comparison graph showing the torque ripple for machines 10, 100A and 100B in accordance with the present invention.

Referring to FIG. 13, a comparison graph 184 showing the torque ripple for machines 100A and 100B and prior art machine 10 is presented. For this graph, the average torque of each machine 100A, 100B and 10 was set approximately equal and the torque ripple was plotted. As can be seen, the torque ripples for both machines 100A and 100B were significantly less than the torque ripple for machine 10. Moreover, the torque ripple for machine 100B (the machine with aperture 178 through ferromagnetic wedge 172) was significantly less than the torque ripple for machine 100A (the machine with no aperture 178 in ferromagnetic wedge 172).

Embodiments of Methods of Making Rotor 122 of Reluctance Machine 100 (FIGS. 14-19)

Figure 14:
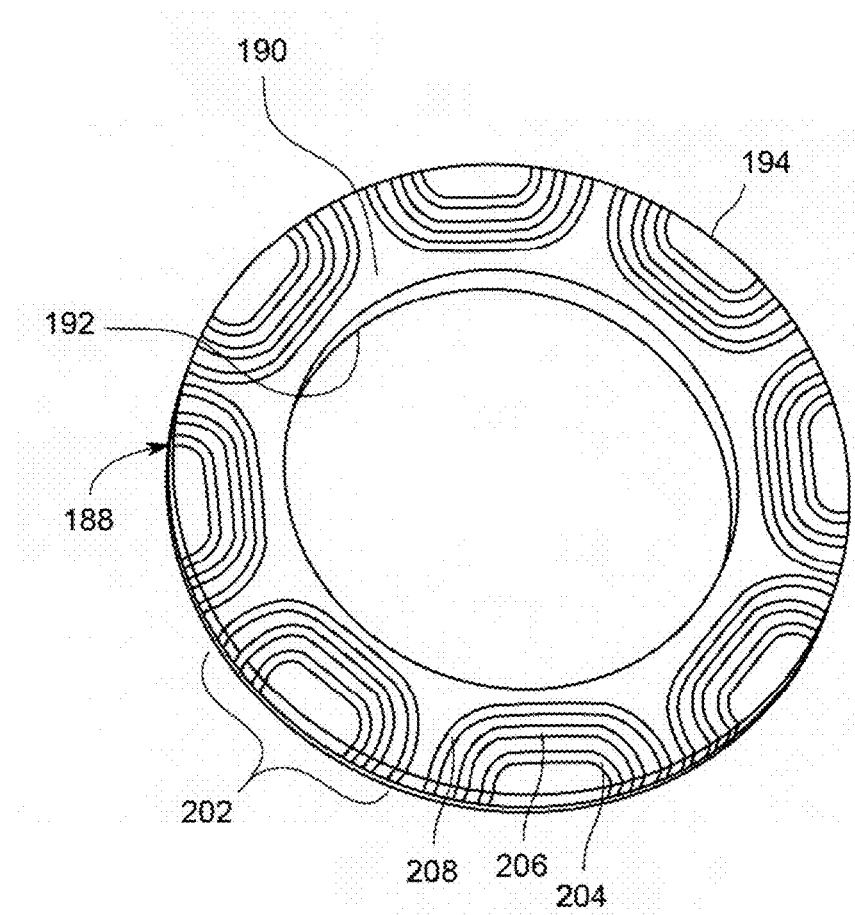
FIG. 14 is a perspective view of a channel support for a method of making rotor 122 of machine 100 in accordance with the present invention.
Figure 15:
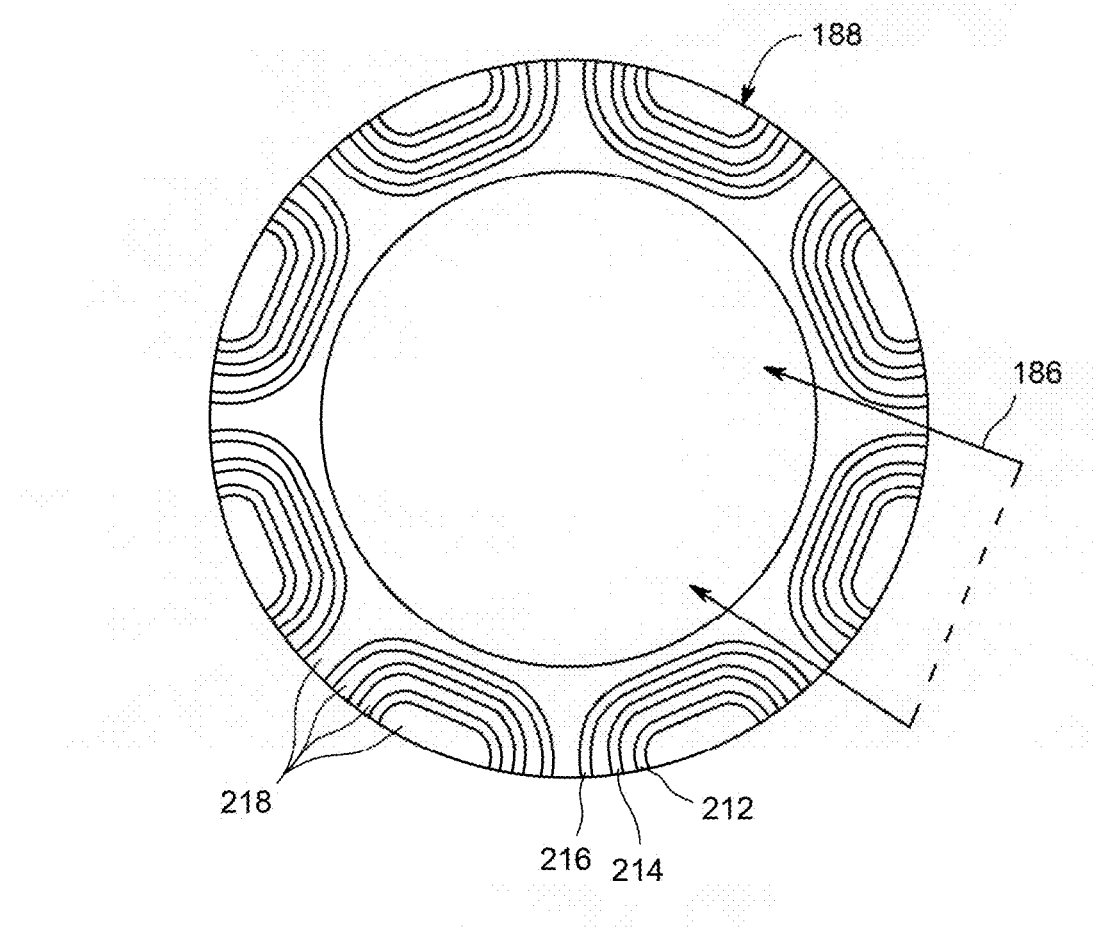
FIG. 15 is a front view of the channel support of FIG. 14.
Figure 16:
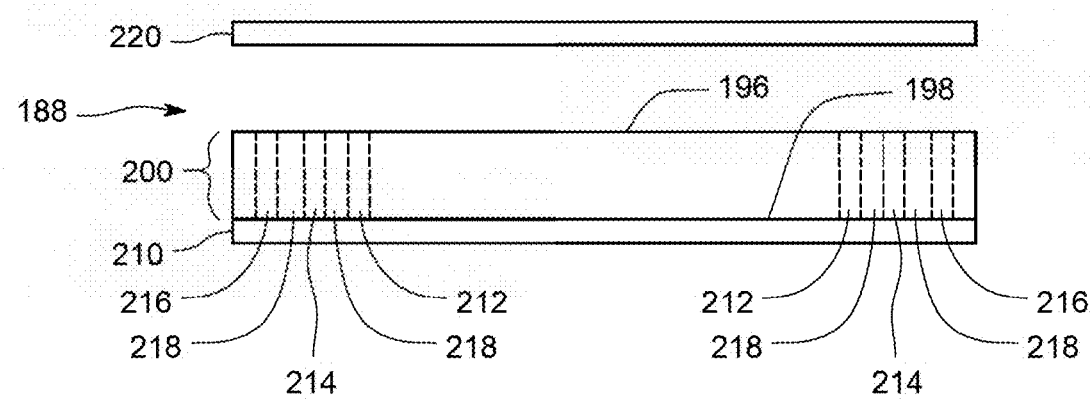
FIG. 16 is a cross-sectional side view of the channel support of FIG. 15 taken along the line 186.

Referring to FIGS. 14, 15 and 16, various views of an exemplary embodiment of a channel support 188 utilized in a method of making rotor 122 of reluctance machine 100 is presented. FIG. 14 is a perspective view of a channel support 188 in accordance with the present invention. FIG. 15 is a front view of the channel support 188 of FIG. 14. FIG. 16 is a cross-sectional side view of the channel support 188 of FIG. 15 taken along the line 186.

The method includes forming a non-ferromagnetic channel support 188. Portions of the channel support may be injection molded as one piece and may be composed of a high performance thermoplastic as discussed earlier.

The channel support 188 includes a generally disc-shaped circular portion 190 having an inner diameter 192 sized to receive a rotor support (not shown) and an outer diameter 194 sized to fit within an inner diameter of a stator (not shown) and rotate about a central axis of the reluctance machine 100. The circular portion 190 also includes first and second side surfaces 196 and 198 (best seen in FIG. 16) defining a lateral thickness 200 there between. A plurality of arrays 202 of arcuate slots 204, 206 and 208 extend laterally from first 196 to second 198 side surfaces.

The channel support 188 also includes a base plate 210 (best seen in FIG. 16) integrally affixed to the second side surface 198 of the circular portion 190 such that the arcuate slots 204, 206 and 208 are open on only the first side 196 of the circular portion 190.

The method further includes inserting a plurality of arcuate ferromagnetic flux guide channels 212, 214 and 216 into the arcuate slots 204, 206 and 208 respectively from the open side 196 of the circular portion 190 such that portions of the channel support abutting the flux guide channels function as non-ferromagnetic flux barriers 218. The flux barriers 218 are designed to provide structural support for the flux guide channels 212, 214 and 216, and preferably provide sole structural support for the flux guide channels. The method also includes disposing a second base plate 220 (best seen in FIG. 16) over the first side surface 196 of the circular portion 190 to cover and rigidly affix the flux guide channels 212, 214 and 216 within the arcuate slots 204, 206 and 208.

In another embodiment, the circular portion 190 may be formed with a ferromagnetic wedge indentation disposed under the smallest arcuate slot 204. The indentation would be sized to have a ferromagnetic wedge, such as the ferromagnetic wedge 172, inserted and affixed therein.

Figure 17:
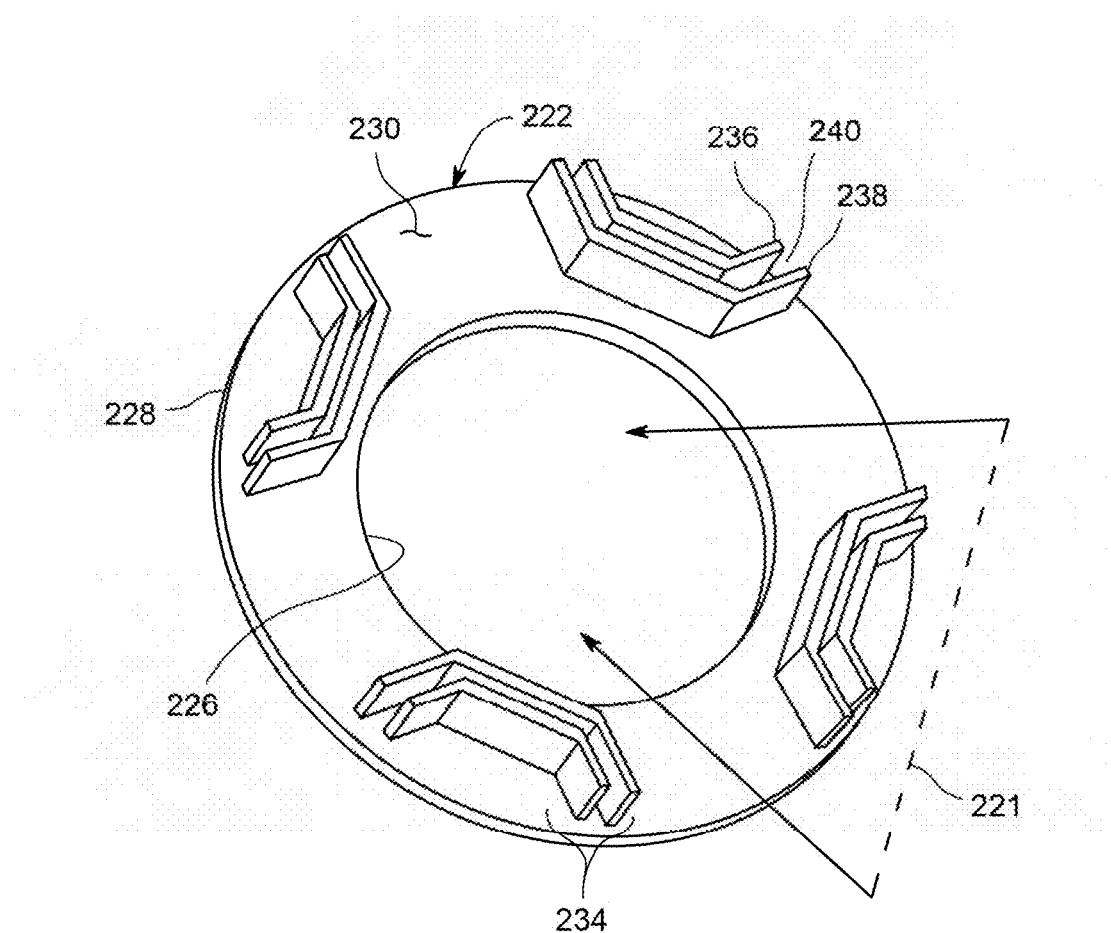
FIG. 17 is a perspective view of a first channel support base plate for an alternative method of making rotor 122 of machine 100 in accordance with the present invention.
Figure 18:
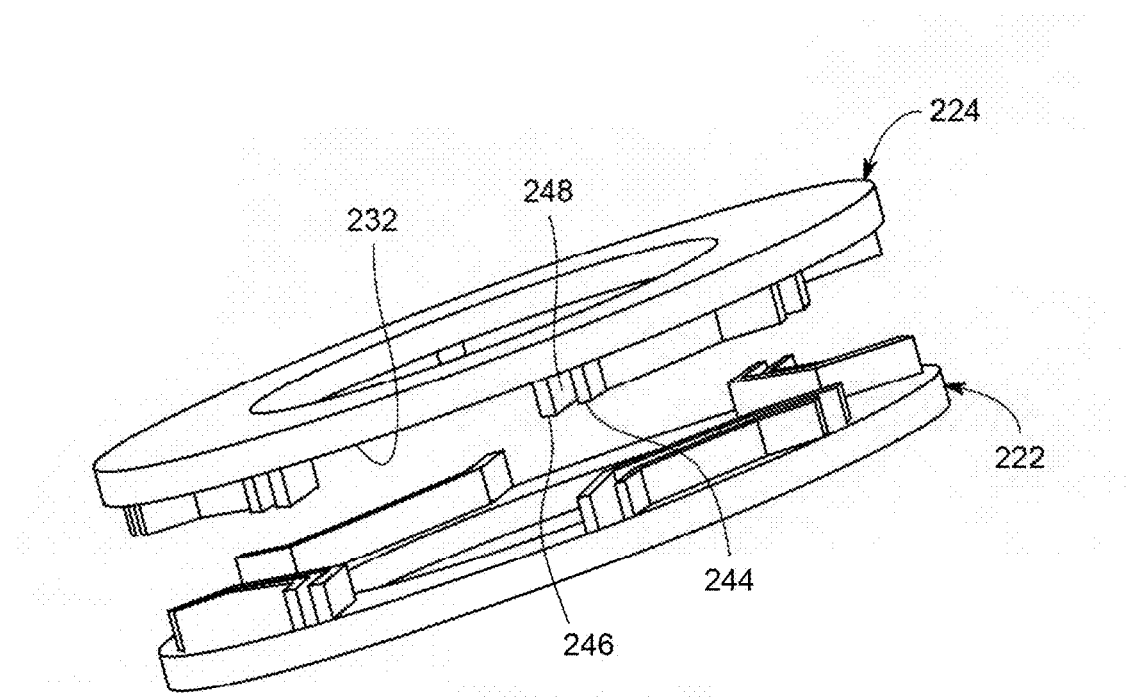
FIG. 18 is a perspective view of first and second channel support base plates in accordance with the present invention.
Figure 19:
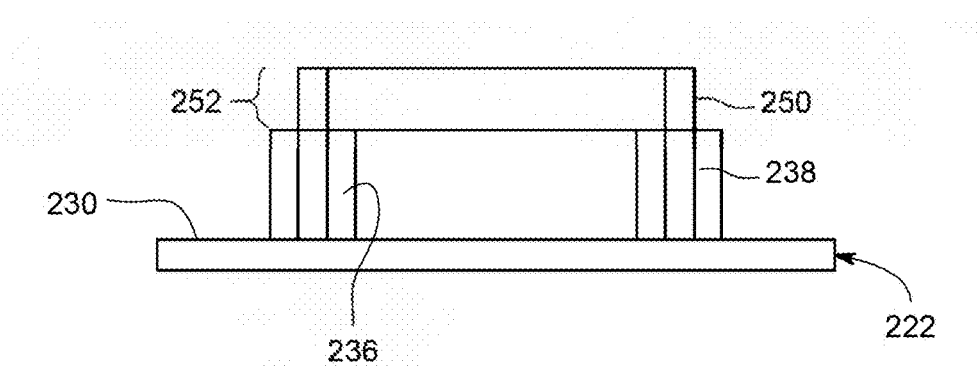
FIG. 19 is a cross-sectional side view of the first channel support base plate of FIG. 17 taken along the line 221 and having a flux guide channel inserted therein in accordance with the present invention.

Referring to FIGS. 17, 18 and 19, various views of an exemplary embodiment of a pair of channel support base plates for an alternative method of making rotor 122 of reluctance machine 100 is presented. FIG. 17 is a perspective view of a first channel support base plate in accordance with one or more aspects of the present invention. FIG. 18 is a perspective view of first and second channel support base plates in accordance with the second invention. FIG. 19 is a cross-sectional side view of the first channel support base plate of FIG. 17 taken along the line 221 and having a flux guide channel 250 inserted therein.

The method may include forming a pair of generally disc-shaped non-ferromagnetic first and second base plates 222 and 224 respectively. The base plates 222 and 224 function as channel supports, similar to channel support 188.

The base plates 222, 224 have identical inner diameters 226 sized to receive a rotor support (not shown) and identical outer diameters 228 sized to fit within an inner diameter of a stator (not shown) and rotate about a central axis of the reluctance machine 100. The first base plate 222 has a first surface 230 and the second base plate has a second surface 232.

The method may further include disposing a plurality of first arrays 234 of non-ferromagnetic first flux barriers 236 and 238 onto the first surface 230. The first flux barriers 236 and 238 project normally from the first surface 230 a predetermined height from the first surface to form an array of arcuate first base plate slots 240. Though in this particular embodiment there is only one slot 240 illustrated, any number of slots may be formed in the array.

The method may also include disposing a plurality of second arrays 242 of non-ferromagnetic second flux barriers 244 and 246 onto the second surface 232, the second flux barriers 244, 246 projecting normally from the second surface 232 a predetermined height from the second surface to form an array of arcuate second base plate slots 248. The first and second base plate slots 240 and 248 have mirror image contours of each other.

The method may further include inserting a plurality of arcuate ferromagnetic flux guide channels 250 (best seen in FIG. 19) into the first base plate slots 240. The flux guide channels 250 having a width which extends beyond the height of the first base plate slots 240 to provide an exposed end portion 252 of the flux guide channels 250.

The method may also include inserting the exposed end portion 252 of the flux guide channels 250 into the second base plate slots 248. The first 236, 238 and second 244, 246 flux barriers providing structural support for the flux guide channels 250 and preferably providing sole structural support for the flux guide channels.

In other embodiments of the method just described, the first 236, 238 and second 244, 246 flux barriers may completely cover the flux guide channels 250 when the first and second base plates 222 and 224 are assembled together. The base plates 222 and 224 may be secured rigidly together by any number of well-known means, for example, by bolting or gluing.

Additionally, the base plates 222 and 224 may be composed of a high performance thermoplastic material. For example, the thermoplastic material may be one of polyether ether ketone (PEEK), polyphenylene sulfide (PPS), polyetherimide (PEI), polyamide-imides (PAI) and/or polyethersulfone (PES). Alternatively, the base plates may be composed of a ceramic material.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope.

While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. .sctn.112, sixth paragraph, unless and until such claim limitations expressly use the phrase "means for" followed by a statement of function void of further structure.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention.

Additionally, while various embodiments of the invention have been described, it is to be understood that aspects of the present invention may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A rotor for a reluctance machine, the rotor comprising:
    a central rotor support rigidly connected to a machine shaft extending laterally along a central axis of the machine, the rotor support having an outer rotor support surface;
    a non-ferromagnetic channel support rigidly affixed to the rotor support surface and projecting radially relative to the central axis from the rotor support surface to define an outer rotor diameter of the rotor; and
    an array of arcuate ferromagnetic flux guide channels, the flux guide channels embedded in the non-ferromagnetic channel support, wherein portions of the channel support abutting the flux guide channels function as non-ferromagnetic flux barriers, the flux barriers providing structural support for the flux guide channels;
    wherein the rotor further comprises a ferromagnetic wedge composed of ferromagnetic material extending laterally relative to the central axis and disposed under the smallest arcuate flux guide channel, the wedge having a radially inner surface proximate the smallest arcuate flux guide channel, and a radially outer surface proximate the outer rotor diameter.

2. The rotor of claim 1 wherein the flux guide channels of the array have a pair of ends proximate the outer rotor diameter, the flux guide channels being stacked radially outward relative to the central axis from a largest arcuate flux guide channel to a smallest arcuate flux guide channel.

3. The reluctance machine of claim 1 wherein the ferromagnetic wedge includes an aperture disposed laterally there through, the aperture defining a radially outer portion of the wedge on a side of the aperture proximate the outer rotor diameter for reducing ripple and a radially inner portion of the wedge on an opposing side of the aperture proximate the smallest arcuate flux guide channel for guiding magnetic flux.

4. The rotor of claim 1 wherein the channel support is composed of a non-ferromagnetic, non-electrically conductive material.

5. The rotor of claim 4 wherein the non-ferromagnetic, non-electrically conductive material comprises one of polyether ether ketone (PEEK), polyphenylene sulfide (PPS), polyetherimide (PEI), polyimide-imides (PAI), polyethersulfone (PES) and a ceramic material.

6. The rotor of claim 1 wherein the flux guide channels are not connected to each other by support structures composed of a ferromagnetic material.

7. The rotor of claim 1 wherein the flux guide channels comprise laminated stacks of ferro-magnetic metal sheets having insulation disposed there between, the laminated stacks extending laterally relative to the central axis.

8. The rotor of claim 1 wherein the flux guide channels comprise solid ferromagnetic material extending laterally relative to the central axis.

* * * * *